United States Patent
Huang et al.

(10) Patent No.: US 8,300,967 B2
(45) Date of Patent: Oct. 30, 2012

(54) BIT RATE CONTROL CIRCUIT AND METHOD FOR IMAGE COMPRESSION

(75) Inventors: Chao-Tsung Huang, Kaohsiung (TW); Yu-Wei Chang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 360 days.

(21) Appl. No.: 12/780,937

(22) Filed: May 17, 2010

(65) Prior Publication Data

US 2011/0123128 A1 May 26, 2011

(30) Foreign Application Priority Data

Nov. 25, 2009 (TW) .............................. 98140205 A (51) Int. Cl.
*G06K 9/36* (2006.01)
*G06K 9/00* (2006.01)
(52) U.S. Cl. .................. 382/250; 382/232; 382/251
(58) Field of Classification Search .................. 382/232, 382/250, 251
See application file for complete search history.

(56) References Cited

U.S. PATENT DOCUMENTS

| | | | |
|---|---|---|---|
| 5,594,554 A | 1/1997 | Farkash et al. | |
| 5,677,689 A | 10/1997 | Yovanof et al. | |
| 6,111,913 A * | 8/2000 | Murdock et al. | 375/240.03 |
| 6,931,159 B2 * | 8/2005 | Ridge | 382/246 |
| 6,968,090 B2 * | 11/2005 | Yokose | 382/251 |
| 7,567,722 B2 * | 7/2009 | Liu et al. | 382/248 |
| 8,009,730 B2 * | 8/2011 | Zhu et al. | 375/240.02 |
| 8,135,063 B2 * | 3/2012 | Kwon et al. | 375/240.03 |
| 8,179,981 B2 * | 5/2012 | Chen et al. | 375/240.27 |
| 2003/0202580 A1 * | 10/2003 | Noh et al. | 375/240.03 |
| 2006/0114989 A1 * | 6/2006 | Panda | 375/240.03 |
| 2007/0036214 A1 * | 2/2007 | Araki | 375/240.03 |
| 2008/0225945 A1 * | 9/2008 | Wu et al. | 375/240.03 |

OTHER PUBLICATIONS

Yue Yu; Jian Zhou; Yiliang Wang; Chang Wen Chen; , "A novel two-pass VBR coding algorithm for fixed-size storage application," Circuits and Systems for Video Technology, IEEE Transactions on , vol. 11, No. 3, pp. 345-356, Mar. 2001.*
P. H. Westerink, R. Rajagopalan and C. A. Gonzales "Two-pass MPEG-2 variable-bit-rate encoding" IBM Journal of Research and Development, vol. 43 Issue 4, Jul. 1999, pp. 471-488.*
Authored by Z. He, et al, article titled "Low-Delay Rate Control for DCT Video Coding via p-Domain Source Modeling," adopted from IEEE Transactions on Circuits and Systems for Video Technology, vol. 11, No. 8, Aug. 2001, pp. 928-940.

* cited by examiner

*Primary Examiner* — Bhavesh Mehta
*Assistant Examiner* — Uptal Shah
(74) *Attorney, Agent, or Firm* — Jianq Chyun IP Office (57) ABSTRACT

A bit rate control circuit for image compression includes a compression unit, a R-value calculation unit, a linear quantization factor (LQF) calculation unit. The compression unit is used to performs a first quantization process on an image based on a default LQF ($LQF_{ini}$) to obtain an initial bits per pixel ($bbp_{ini}$) with an initial number of zero coefficients ($R_{ini}$). The R-value calculation unit calculates out a target R value ($R_{target}$) based on the initial bits per pixel ($bbp_{ini}$), the initial number zero coefficients ($R_{ini}$), and a target bpp ($bbp_{target}$). The LQF calculation unit calculates a target LQF ($LQF_{target}$) based on the target R value $R_{target}$. The $LQF_{target}$ can be used to perform a second compression on the image to obtain a compressed image corresponding to the target bpp ($bbp_{target}$).

20 Claims, 6 Drawing Sheets

BIT RATE CONTROL CIRCUIT AND METHOD FOR IMAGE COMPRESSION

CROSS-REFERENCE TO RELATED APPLICATION

This application claims the priority benefit of Taiwan application serial no. 98140205, filed on Nov. 25, 2009. The entirety of the above-mentioned patent application is hereby incorporated by reference herein and made a part of specification.

BACKGROUND OF THE INVENTION

1. Field of the Invention

The invention relates to an image compression technology. More particularly, the invention relates to a bit rate control technology for image compression.

2. Description of Related Art

Image compression technology effectively reduces memory occupied by an original image in order to save storage capacity but keep image contents. The image compression rate normally varies with complexity of image contents. However, for the application on digital camera to compress the static image, the occupied memory size is intended to be reduced but also the sizes for all the compressed images are also expected to have about the same size substantially not changing with the complexity of image content.

To maintain the image size, bit rate control of static image compression plays an important role, such that the image size of the static images is not significantly changed along with the image contents, and that a user can be aware of the remaining image storage capacity.

In U.S. Pat. No. 5,594,554, it is disclosed that a quantization table to be set in a second compression can be obtained based on a default algorithm model and the size of an image on which a first compression is performed. However, the default algorithm model achieves different levels of accuracy when this model is applied to different images. Moreover, the algorithm model adopted in this patent is rather complicated because logarithm calculation is implemented.

In U.S. Pat. No. 5,677,689, it is disclosed that a quantization table to be set in a second compression can be obtained based on a default algorithm model and an activity metric generated in a first compression. Nonetheless, the file compressed in a second compression can merely be smaller but not greater than the file compressed in the first compression.

In the related art, it is also disclosed that a factor ρ is defined as a ratio of the number R of zero coefficients to a total number T of coefficients after quantization. The factor ρ can be relevant to the size of compressed images.

SUMMARY OF THE INVENTION

The invention is directed to a bit rate control circuit for image compression and a bit rate control method for image compression, so as to easily calculate a target linear quantization factor $LQF_{target}$ on which a second compression is based. Thereby, a target image file size can be maintained.

In an embodiment of the invention, a bit rate control circuit for image compression is provided. The bit rate control circuit includes a compression unit, an R-value calculation unit, and a linear quantization factor (LQF) calculation unit. The compression unit performs a quantization process on an image based on a default quantization table and an LQF. When the compression unit performs a first compression on the image, the LQF is a default LQF ($LQF_{ini}$), and an initial number of bits per pixel ($bbp_{ini}$) and an initial number of zero coefficients ($R_{ini}$) are obtained. The R-value calculation unit calculates a target R value ($R_{target}$) after the quantization process is performed based on a target number of bits per pixel ($bpp_{target}$). The LQF calculation unit calculates a target LQF ($LQF_{target}$) based on the $R_{target}$ calculated by the R-value calculation unit. The $LQF_{target}$ can be used to perform a second compression on the image.

According to an embodiment of the invention, in the bit rate control circuit, the R-value calculation unit, for example, calculates the $R_{target}$ based on the $bpp_{target}$ by referencing a linear correlation between a coordinate of the $bbp_{ini}$ and the $R_{ini}$ and a common origin.

According to an embodiment of the invention, in the bit rate control circuit, the number of bits per pixel of the common origin is zero, and a coordinate of the common origin and the number of bits per pixel is (zero, total number T of coefficients), for example.

According to an embodiment of the invention, in the bit rate control circuit, the LQF calculation unit calculates the $LQF_{target}$ correlating with the $R_{target}$ by referencing a numerical correlation between the R value and the LQF, for example.

According to an embodiment of the invention, in the bit rate control circuit, the numerical correlation between the R value and the LQF includes calculation of a set of zero coefficients ($R_{set}$) correlating with a plurality of LQFs during the first compression performed by the compression unit, and the $R_{set}$ is provided to the LQF calculation unit to calculate the $LQF_{target}$ correlating with the $R_{target}$ by linear interpolation, for example.

According to an embodiment of the invention, in the bit rate control circuit, the LQFs are a plurality of multiples of the $LQF_{ini}$, for example.

According to an embodiment of the invention, in the bit rate control circuit, the LQFs include $LQF_{ini}/4$, $LQF_{ini}/2$, $LQF_{ini}*2$, and $LQF_{ini}*4$, for example.

According to an embodiment of the invention, in the bit rate control circuit, the R-value calculation unit and the LQF calculation unit are an integrated calculation unit, for example.

According to an embodiment of the invention, in the bit rate control circuit, the $LQF_{target}$ is input into the compression unit to perform the second compression on the image, for example.

According to an embodiment of the invention, the bit rate control circuit further includes another compression unit which performs another second compression based on the $LQF_{target}$, for example.

According to an embodiment of the invention, in the bit rate control circuit, the image is a static image, for example.

In an embodiment of the invention, a bit rate control method for image compression is also provided. The bit rate control method includes performing a first compression on an image, and the first compression is a quantization process performed on the image based on a default quantization table and a default linear quantization factor ($LQF_{ini}$). Next, when the first compression is performed, an initial number of bits per pixel ($bbp_{ini}$) and an initial number of zero coefficients ($R_{ini}$) are calculated. After that, an R value is calculated. The step of calculating the R value includes calculating a target R value ($R_{target}$) based on a target number of bits per pixel ($bpp_{target}$) after the quantization process is performed. A linear quantization factor (LQF) is then calculated. The step of calculating the LQF includes calculating a target linear quantization factor ($LQF_{target}$) based on the $R_{target}$. Thereafter, a second compression is performed on the image based on the $LQF_{target}$.

According to an embodiment of the invention, in the bit rate control method, the step of calculating the R value refers to calculating the $R_{target}$ based on the $bpp_{target}$ by referencing a linear correlation between a coordinate of the $bbp_{ini}$ and the $R_{ini}$ and a common origin, for example.

According to an embodiment of the invention, in the bit rate control method, during the step of calculating the R value, coordinates of the number of bits per pixel and the number of zero coefficients at the common origin are zero and T, for example.

According to an embodiment of the invention, in the bit rate control method, the step of calculating the LQF refers to calculating the $LQF_{target}$ correlating with the $R_{target}$ by referencing a numerical correlation between the R value and the LQF, for example.

According to an embodiment of the invention, in the bit rate control method, the numerical correlation between the R value and the LQF includes calculation of a set of zero coefficients ($R_{set}$) correlating with a plurality of LQFs during the first compression, so as to calculate the $LQF_{target}$ correlating with the $R_{target}$ by linear interpolation in the step of calculating the LQF, for example.

According to an embodiment of the invention, in the bit rate control method, the LQFs are a plurality of multiples of the $LQF_{ini}$, for example, for example.

According to an embodiment of the invention, in the bit rate control method, the LQFs include $LQF_{ini}/4$, $LQF_{ini}/2$, $LQF_{ini}*2$, and $LQF_{ini}*4$, for example.

According to an embodiment of the invention, in the bit rate control method, the numerical correlation between the R value and the LQF is a pre-calculated correlation curve, for example.

According to an embodiment of the invention, in the bit rate control method, the image is a static image, for example.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention and are incorporated in and constitute a part of this specification. The drawings illustrate embodiments of the invention and, together with the descriptions, serve to explain the principles of the invention. In the drawings.

DESCRIPTION OF EMBODIMENTS

Images are compressed to a predetermined size based on a concept of factor ρ according to this invention. In the invention, a simple and accurate bit rate control method is provided for compressing static images, such as JPEG images. Embodiments are described hereinafter to clarify the invention. However, the invention is not limited to the embodiments described herein. Besides, combinations or modifications can be properly made to the embodiments without departing from the spirit and scope of the invention.

Figure 1:
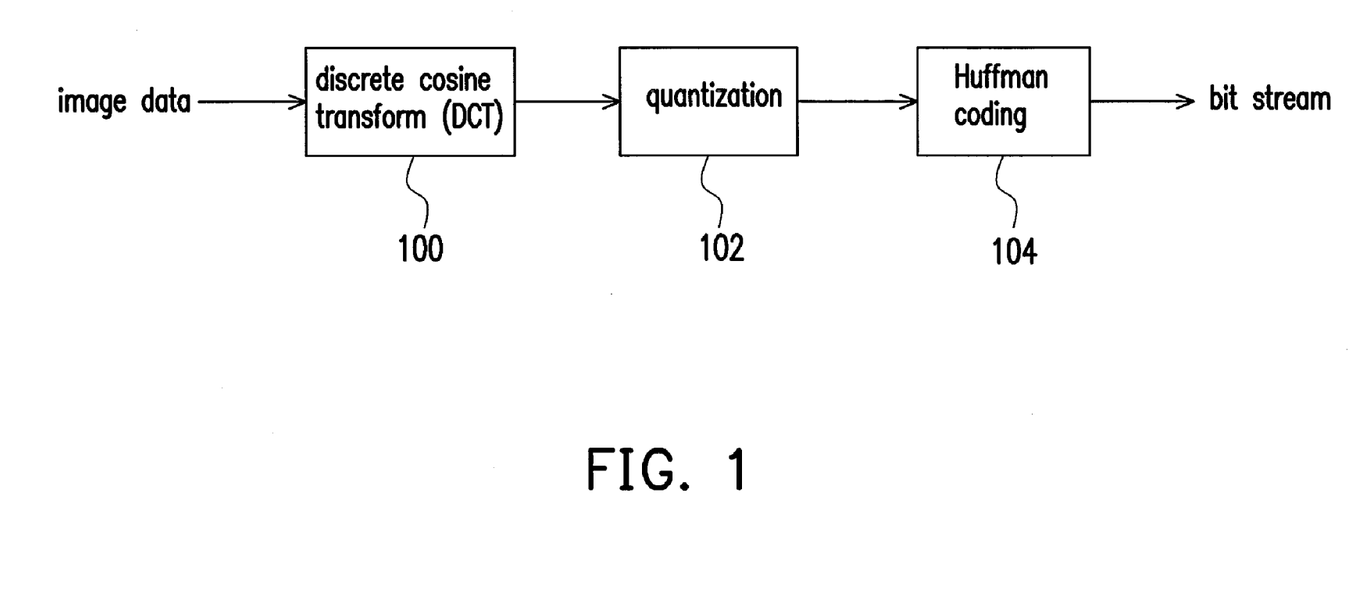
FIG. 1 is a schematic view illustrating standard JPEG compression.

FIG. 1 is a schematic view illustrating standard JPEG compression. With reference to FIG. 1, after digital image data are input, the data are transformed by a discrete cosine transform (DCT) unit 100 and quantized by a quantization unit 102, which obtains the quantized result by quantizing the DCT coefficients according to the quantization table Q[i]. The quantization results are encoded by a Huffman coding unit 104 then appears in a standard bit stream, i.e. the JPEG stream.

Usually, an operation unit for the DCT unit 100 is a 8×8 pixel block, and each of the 8×8 pixel blocks has 64 DCT coefficients after transformation. The quantization table Q[i] records the quantization coefficients corresponding to each location.

For instance, the quantization table Q[i] normally includes a default quantization table and a linear quantization factor (LQF). The default quantization table is $\{Q_{default}[i], i:0\sim63\}$, for example, and accuracy of the quantization table Q[i] for image compression is $1/512$, for example. Under said conditions, the quantization table Q[i] is represented by following equation:

$$Q[i]=\min(255,\max(1,(Q_{default}[i]*LQF+256)/512)) \qquad (1)$$

Here, Q[i] and $Q_{default}[i]$ are both positive integers ranging from 1 to 255. LQF is used to enlarge or shrink the default quantization table in linear proportion. In the aforesaid example, the accuracy is set as $1/512$. In the following embodiments, unless specified to the contrary, the accuracy of LQF is supposingly set as $1/512$ as well. Besides, as known to people having ordinary skill in the art, the default quantization tables for Y and Cb/Cr are usually different.

Prior to explanations on a method of enlarging or shrinking images in proportion for image compression, descriptions regarding the aforesaid factor ρ are given herein. The factor ρ is defined as a ratio of the number R of zero coefficients to a total number T of coefficients after a quantization process is performed, i.e. ρ=R/T.

Note that the R value mentioned hereinafter represents the number R of zero coefficients after quantization, and the R value is different from the bits per pixel (bpp) when different methods for image compression are applied. A JPEG image is employed for experiment described below. Certainly, after experiments are conducted on various images, the experimental results suggest general characteristics of image compression, and the characteristics do not vary with the image contents.

Figure 2:
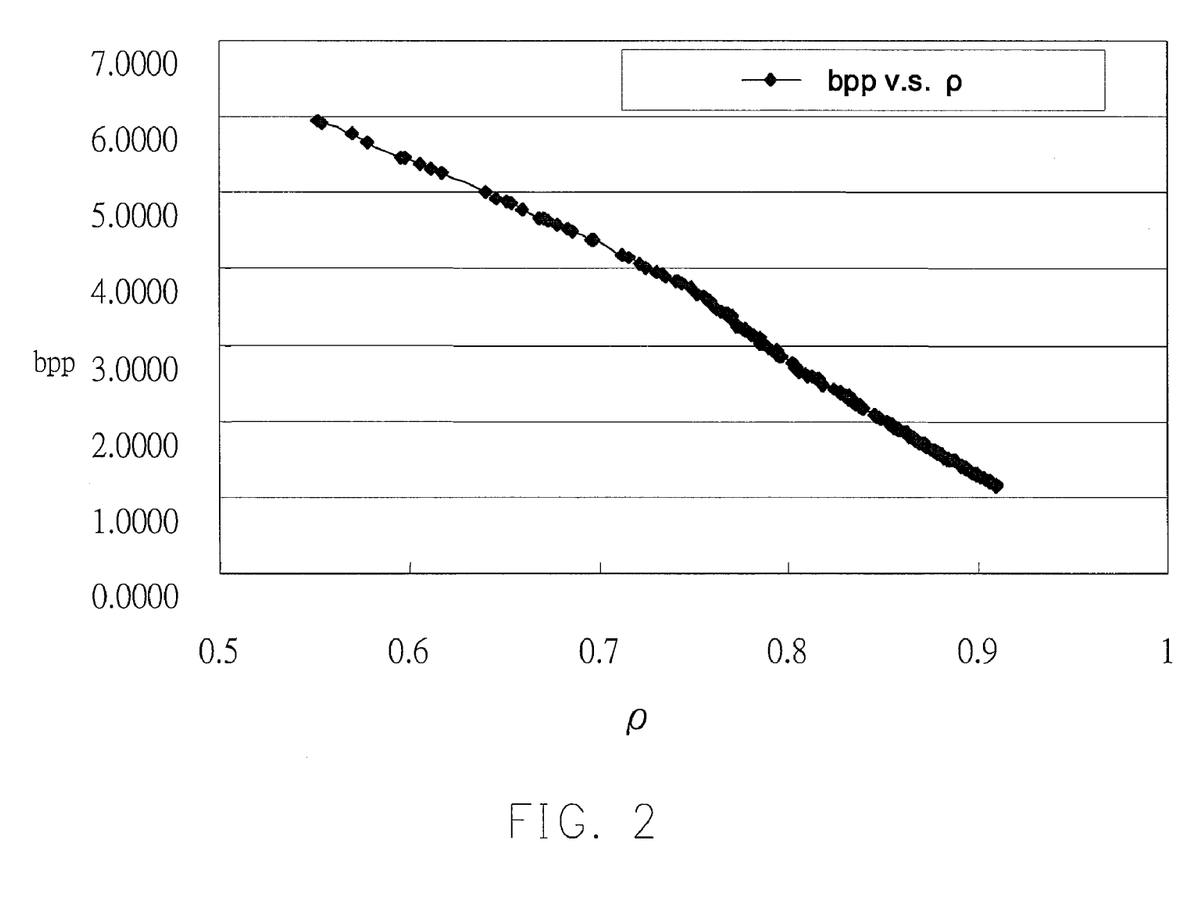
FIG. 2 is a schematic graph illustrating a correlation between bits per pixel (bpp) and a factor ρ according to an embodiment of the invention.

In one image, the number T of compression coefficients is a constant number, while the number R of zero coefficients is varied in accordance with the image contents after image compression. Since the factor ρ is defined as ρ=R/T, the factor ρ is relevant to the size of image files. FIG. 2 is a schematic graph illustrating a correlation between bpp and the factor ρ according to an embodiment of the invention. See FIG. 2. The horizontal axis is set as the factor ρ and the vertical as bpp. The quantity of bits herein refers to the encoded data obtained from the quantization coefficients after DCT, excluding the header of JPEG. The distribution of the correlative bpp and ρ indicates an approximately linear correlation. When the factor ρ is small, e.g. when the factor ρ drops to 0.7, the approximately linear correlation still stays even when the slope of the correlation line slightly decreases. Therefore, accuracy is acceptable because the linear correlation between bpp and p remains intact. Said linear correlation is conducive to later calculation and approximation. It can also show that when the factor ρ approaches 1, bpp approaches 0. Hence, from any given curve, when the $\rho_0$ and $bpp_0$ coordinates are given, a reference line between ($\rho_0$, $bpp_0$) and (1,0) can be used to study the relation between bpp and ρ.

Furthermore, given T is a constant to a pictorial curve, when T is corrected, the line can used as another reference line, as the one formed between $R_0$ and $bpp_0$, to study the relation between bpp and R. In actual application, ρ can be replaced by R to simplify the hardware and software computation. An embodiment of the application will be detailed later.

Figure 3:
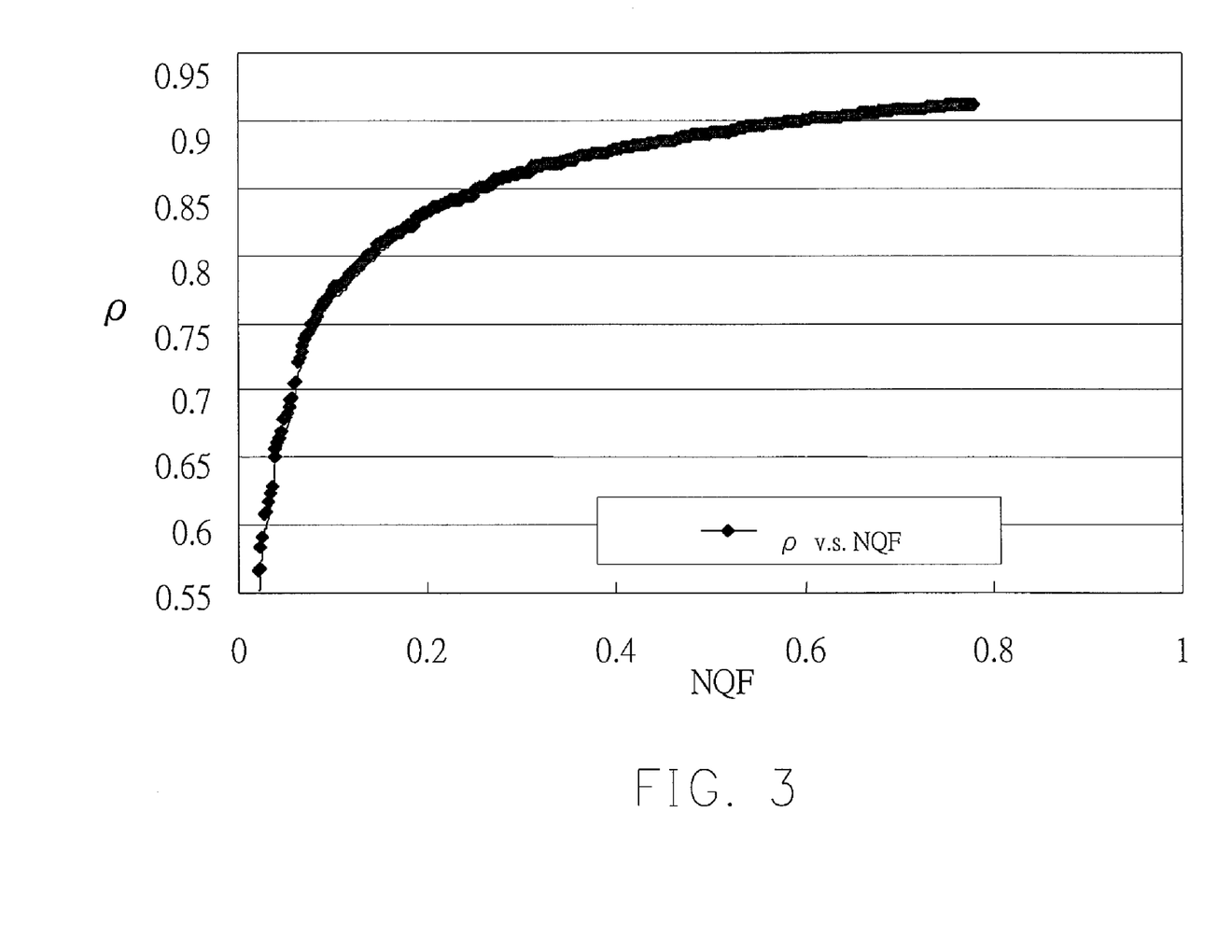
FIG. 3 is a schematic graph illustrating a correlation between the factor ρ and NQF.

Next, correlations for bit rate control are described in the invention. FIG. 3 is a schematic graph illustrating a correlation between the factor ρ and NQF. NQF herein refers to normalized LQF, i.e. normalized quantization factor=LQF/512. With reference to FIG. 3, the correlation between the factor ρ and NQF is represented by a smooth curve. Namely, the correlation between the factor ρ and LQF can be represented by a smooth curve as well. Simple mathematic equation may not suffice to explicate the idea of the curve, but the curve can be described by numerical manner. That is to say, the curve of the factor ρ and NQF can be described by using reference points. The points between the reference points can be calculated by using interpolation, such as linear interpolation.

From FIGS. 2 and 3, it can be observed that bpp correlates with LQF, and the curve of FIG. 3 can be generally achieved by performing statistical manner. However, the reference points in the curve can also be calculated during the first compression, which is described hereinafter. Moreover, according to this invention, the factor analysis on different images is conducted to confirm that the characteristics of the curve shown in FIGS. 2 and 3 fall within the normal distribution and do not vary significantly with the image contents. Hence, the bpp can be controlled by properly adjusting the LQF. After the images are compressed again, the bpp approximate to the desired level can be achieved.

Figure 4:
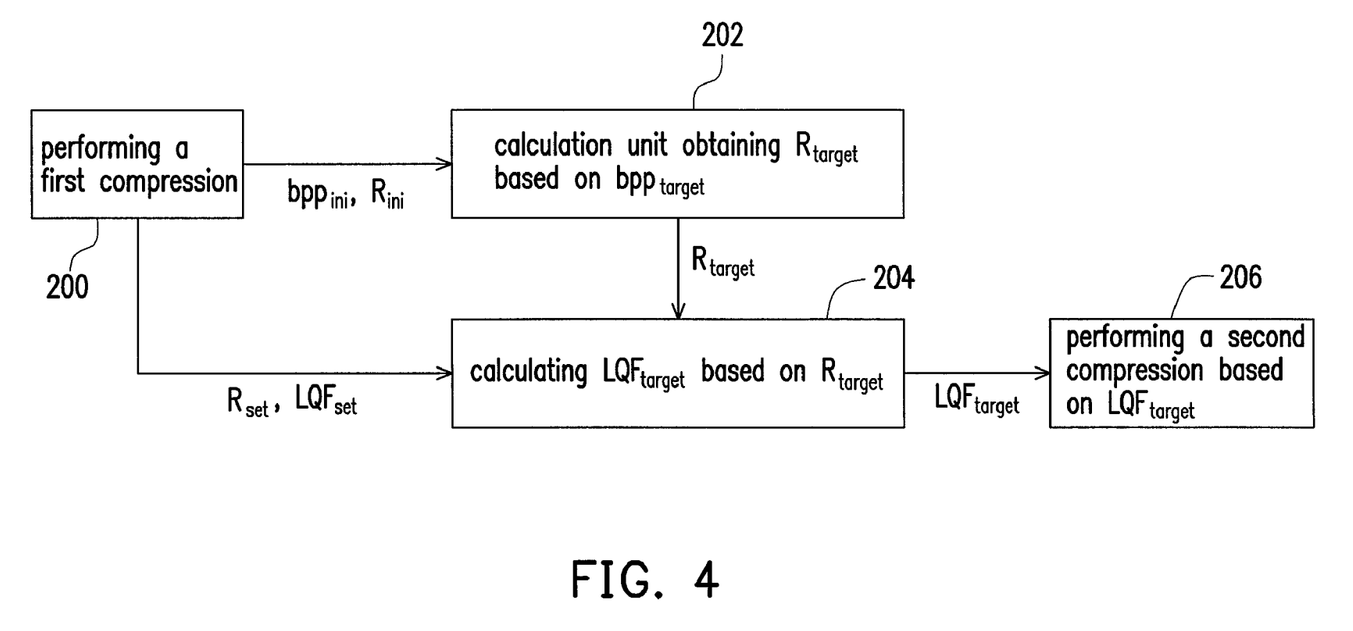
FIG. 4 is a schematic block view illustrating a bit rate control circuit for image compression according to an embodiment of the invention.

FIG. 4 is a schematic block view illustrating a bit rate control circuit for image compression according to an embodiment of the invention. As shown in FIG. 4, the bit rate control circuit for image compression includes a compression unit 200, an R-value calculation unit 202, and an LQF calculation unit 204. The compression unit 200 performs a quantization process on an image based on a default quantization table and an LQF. In other words, the compression unit 200 performs a first image compression on the image to obtain an initial number of bits per pixel ($bbp_{ini}$) and an initial number of zero coefficients ($R_{ini}$), according to a default linear quantization factor ($LQF_{ini}$). Based on the initial number of bits per pixel ($bbp_{ini}$) and a target number of bpp ($bpp_{target}$) the R-value calculation unit 202 calculates a target R value ($R_{target}$) after the quantization is performed. The LQF calculation unit 204 calculates a target LQF ($LQF_{target}$) based on the $R_{target}$ calculated by the R-value calculation unit 202. The $LQF_{target}$ allows a compression unit 206 to perform a second compression on the image. For example, the $LQF_{target}$ in replacement of the $LQF_{ini}$ is then input into the compression unit 200 to perform the second compression on the image.

Here, the LQF calculation unit 204 calculates the desired $LQF_{target}$ based on the correlation depicted in FIG. 3. To gather the data for the curve as illustrated in FIG. 3, that is, to describe the curve numerically, a set of data points is needed. In other words, the $R_{set}$ comprised of a plurality of different R values is required, and the different R values correlate with a set of $LQF_{target}$ comprised of a plurality of different LQFs. Generally, the R values are calculated and obtained based on the correlating numerical points on the set of $LQF_{target}$. These R values, for instance, can be obtained in advance by multiple quantizations.

However, a more convenient way to obtain the desired $R_{set}$ is provided in this invention. That is, when the first compression is performed by the compression unit 200, a set of curve data points is simultaneously calculated and obtained. This means $R_{set}$ can be obtained without performing multiple quantizations. For instance, quantization through rounding is performed to calculate the number of DCT coefficients x[i] and quantization coefficients Q[i] correlating with the selected LQFs.

First, for instance, x'[i] is obtained by formula (2):

$$x'[i]=\text{sign}(x[i])*\text{int}((\text{abs}(x[i])+Q[i]/2)/Q[i]). \quad (2)$$

Here, sign( ) represents a signum function, abs( ) represents an absolute value function, and int( ) represents an integer function returning the integer part of a specified number. When the result of quantization reaches zero, (abs(x[i])+Q[i]/2)/Q[i]<1, i.e. abs(x[i])/Q[i]<½. The value abs(x[i])/Q[i] is the natural product in the quantization process during compression. Further, the later added value Q[i]/2 in this formula is obtained through rounding, which is just one of the many methods and is not limited in the invention. The added value Q[i]/2 can also be another value, e.g. Q[i]/4, which is not obtained through rounding. $LQF_{set}$ is selected from five points $LQF_{set}$={$LQF_{ini}/4$, $LQF_{ini}/2$, $LQF_{ini}/1$, $LQF_{ini}*2$, $LQF_{ini}*4$}, for example, and the correlating $R_{set}$ can be obtained by comparing their values as indicated below.

$R_{ini}$={x[i] matches the number of abs(x[i])/Q[i]<½}.

$R_{LQFini/2}$={x[i] matches the number of abs(x[i])/Q[i]<¼}.

$R_{LQFini/4}${x[i] matches the number of abs(x[i])/Q[i]<⅛}.

$R_{LQFini*2}$={x[i] matches the number of abs(x[i])/Q[i]<1}.

$R_{LQFini*4}$={x[i] matches the number of abs(x[i])/Q[i]<2}.

That is to say, in the entire process, first, a first JPEG compression is performed based on the $LQF_{ini}$, so as to obtain the $bpp_{ini}$ and the $R_{ini}$. Next, given the characteristics of the curve depicted in FIG. 2, a straight line can be formed between ($bpp_{ini}$, $R_{ini}$) and (0, T), and the $R_{target}$ can be obtained by substituting $bpp_{target}$. Besides, subsequent steps that follow the $R_{ini}$ in the first JPEG compression can render quantization factors through DCT coefficients, namely $R_{LQFini/2}$, $R_{LQFini/4}$, $R_{LQFini*2}$, and $R_{LQFini*4}$ respectively correlating with $LQF_{ini}/2$, $LQF_{ini}/4$, $LQF_{ini}*2$, and $LQF_{ini}*4$. $LQF_{set}$ is {$LQF_{ini}/4$, $LQF_{ini}/2$, $LQF_{ini}$, $LQF_{ini}*2$, $LQF_{ini}*4$}, and the correlating $R_{set}$ is {$R_{LQFini/4}$, $R_{LQFini/2}$, $R_{ini}$, $R_{LQFini*2}$, $R_{LQFini*4}$}. Here, $R_{set}$ is obtained by calculation as stated above, for example.

After that, calculation of the $LQF_{target}$ can be made by interpolation, e.g. linear interpolation. For example, $R_1$ and $R_2$ closest to the $R_{target}$ can be selected from the $R_{set}$, and the line connecting ($R_1$, $LQF_1$) and ($R_2$, $LQF_2$) is found based on the correlating $LQF_1$ and $LQF_2$. After that, the $LQF_{target}$ can be obtained when the $R_{target}$ is substituted into the linear equation. The second compression is then performed on the original image based on the $LQF_{target}$ to obtain the final result.

By applying the aforesaid method, a bit rate control process is described below, given that an image in size of 4064×2704 is compressed with the JPEG-422 format. First of all, if $bpp_{target}=3$ is desired while the initial compression value is $LQF_{ini}=96$. After the first compression, the values $bpp_{ini}=2.429$, $R_{ini}=18108052$, and $R_{set}=\{14688698, 16739607, 18108052, 19161683, 19980455\}$ correlating with $LQF_{set}=\{LQF_{ini}/4, LQF_{ini}/2, LQF_{ini}, LQF_{ini}*2, LQF_{ini}*4\}=\{24, 48, 96, 192, 384\}$ can be obtained, for example. Next, the $bpp_{target}$ (=3) is substituted into the linear equation representing the line connecting (2.429, 18108052) and (0, T=21978112), and thereby the $R_{target}=17198293$ is obtained. Then, it can be learned from the analysis that the $R_{target}$ ranges from 16739607 to 18108052, which respectively correlates with LQF=48 and LQF=96. The $R_{target}$ is then substituted into the linear equation formed by the line connecting (16739607, 48) and (18108052, 96), so as to obtain the $LQF_{target}=64$, which is the estimated value corresponding to the desired bit rate $bpp_{target}=3$.

Finally, the second compression is performed when the $LQF_{ini}$ (=96) is replaced by the $LQF_{target}$ (=64), and the result bpp=3.01137 with difference from the $bpp_{target}=3$ by 0.38%, can be obtained. As such, the image can be easily compressed with a bbp close to the $bpp_{target}$. Namely, the image file can be shrunk or enlarged nearly at the $bpp_{target}$.

The aforementioned $LQF_{target}$ uses five points to describe the curve. However, in order to increase the accuracy level and expand the quantizing magnitude of factors, it is likely to add $R_{LQFini*8}$ or $R_{LQFini/8}$ to the $R_{set}$. In other words, with more reference points, the curve can be described more accurately. Moreover, linear interpolation can be replaced by polynomial interpolation to increase the accuracy level of interpolation of the $LQF_{target}$, for example. In another embodiment, the accuracy level of LQF can be set up to 1/1024 to ensure the accuracy level of quantization factors, for example.

Figure 5:
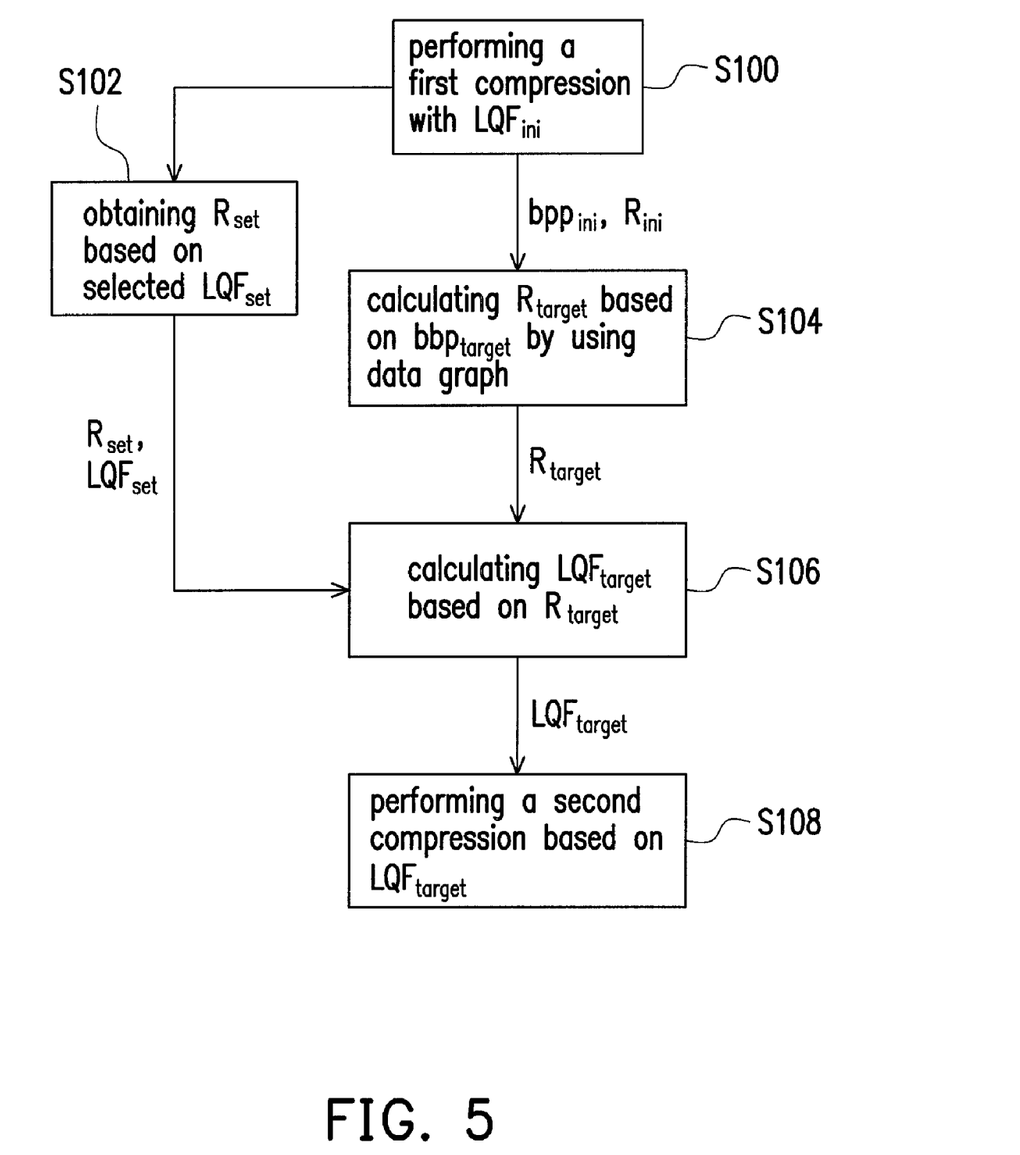
FIG. 5 is a schematic flowchart illustrating a bit rate control method for image compression according to an embodiment of the invention.

FIG. 5 is a schematic flowchart illustrating a bit rate control method for image compression according to an embodiment of the invention. With reference to FIG. 5, the bit rate control method for image compression includes performing a first compression on an image with $LQF_{ini}$ in step S100. In the first compression, a quantization process is performed on the image based on a default quantization table $Q_{ini}[i]$ and a default linear quantization factor $LQF_{ini}$. When the first compression is performed, an initial number of bits per pixel ($bbp_{ini}$) and an initial number of zero coefficients ($R_{ini}$) are simultaneously calculated and obtained. In step S102, a set of zero coefficients ($R_{set}$) is also calculated and obtained during the first compression based on the $LQF_{set}$. In step S104, an R value is calculated. The step of calculating the R value includes calculating a target R value ($R_{target}$) based on a target number of bits per pixel ($bpp_{target}$) after the quantization process is performed. An LQF is then calculated in step S106. The step of calculating the LQF includes calculating a target linear quantization factor ($LQF_{target}$) based on the $R_{target}$. In step S208, a second compression is performed on the image based on the $LQF_{target}$.

In the aforesaid bit rate control method for image compression, the calculation is made in step S102 during the first compression for simplifying the entire compression process. Nonetheless, as long as the $LQF_{target}$ correlating with the $R_{target}$ can be analyzed, the correlative curve between the $LQF_{target}$ and the $R_{target}$ can be obtained through various ways in addition to the method depicted in FIG. 5.

Figure 6:
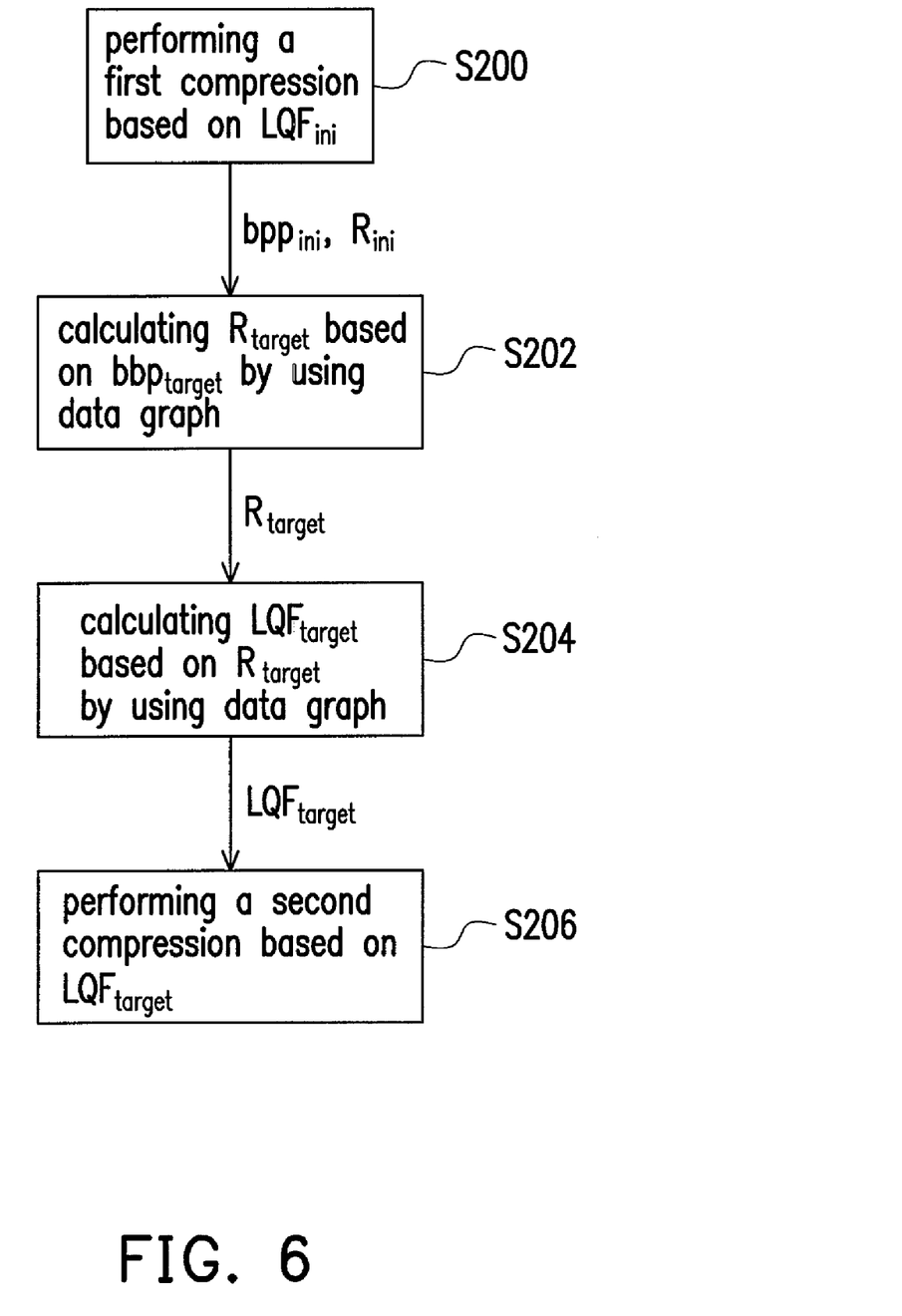
FIG. 6 is a schematic flowchart illustrating a bit rate control method for image compression according to an embodiment of the invention.

FIG. 6 is a schematic flowchart illustrating a bit rate control method for image compression according to an embodiment of the invention. With reference to FIG. 6, in step S200, a first compression is performed on an image, and the first compression is a quantization process performed on the image based on a default quantization table $Q_{ini}[i]$ and a default linear quantization factor ($LQF_{ini}$). When the first compression is performed, an initial number of bits per pixel ($bbp_{ini}$) and an initial number of zero coefficients ($R_{ini}$) are simultaneously calculated and obtained. After that, an R value is calculated in step S202. The step of calculating the R value includes calculating a target R value ($R_{target}$) based on a target number of bits per pixel ($bpp_{target}$) after the quantization process is performed. In step S204, an LQF is calculated. The step of calculating the LQF includes calculating a target linear quantization factor ($LQF_{target}$) based on the $R_{target}$. For example, the interpolation calculation of the $LQF_{target}$ can be made by using a curve data table. In other words, the curve data table applied in step S204 can be generated in advance or obtained by performing step S102 depicted in FIG. 5, which should not be construed as limitations to the invention. In step S206, a second compression is performed on the image based on the $LQF_{target}$.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A bit rate control circuit for image compression, the bit rate control circuit comprising:
    a compression unit, used to perform a first quantization process on an image based on a linear quantization factor ($LQF_{ini}$) to obtain an initial number of bits per pixel ($bbp_{ini}$) and an initial number of zero coefficients ($R_{ini}$) are obtained;
    an R-value calculation unit calculating a target R value ($R_{target}$) after quantization based on the initial number of bits per pixel and a target number of bits per pixel ($bpp_{target}$);
    a linear quantization factor (LQF) calculation unit calculating a target linear quantization factor ($LQF_{target}$) based on the target R value ($R_{target}$);
    wherein a second compression is performed on the image based on the target linear quantization factor ($LQF_{target}$), to obtain a compressed image with respect to the target number of bits per pixel.

2. The bit rate control circuit as claimed in claim 1, wherein the R-value calculation unit calculates the target R value ($R_{target}$) based on the target number of bits per pixel ($bpp_{target}$) by referencing a linear correlation between a coordinate of the initial number of bits per pixel ($bbp_{ini}$) and the initial number of zero coefficients ($R_{ini}$) and a common origin.

3. The bit rate control circuit as claimed in claim 2, wherein coordinates of the number of bits per pixel and the number of zero coefficients at the common origin are zero and total number T of coefficients.

4. The bit rate control circuit as claimed in claim 1, wherein the linear quantization factor (LQF) calculation unit calculates the target linear quantization factor ($LQF_{target}$) correlating with the target R value ($R_{target}$) by referencing a numerical correlation between the R value and the linear quantization factor (LQF).

5. The bit rate control circuit as claimed in claim 4, wherein the numerical correlation between the R value and the linear quantization factor (LQF) comprises calculation of a set of zero coefficients ($R_{set}$) correlating with a plurality of linear quantization factors (LQFs) during the first compression performed by the compression unit, and the set of zero coefficients ($R_{set}$) is provided to the linear quantization factor (LQF) calculation unit to calculate the target linear quantization factor ($LQF_{target}$) correlating with the target R value ($R_{target}$) by linear interpolation.

6. The bit rate control circuit as claimed in claim 5, wherein the linear quantization factors (LQFs) are a plurality of multiples of default linear quantization factors ($LQF_{ini}$).

7. The bit rate control circuit as claimed in claim 5, wherein the linear quantization factors (LQFs) comprise $LQF_{ini}/4$, $LQF_{ini}/2$, $LQF_{ini}/1$, $LQF_{ini}*2$, and $LQF_{ini}*4$.

8. The bit rate control circuit as claimed in claim 1, wherein the R-value calculation unit and the linear quantization factor (LQF) calculation unit are an integrated calculation unit.

9. The bit rate control circuit as claimed in claim 1, wherein the target linear quantization factor ($LQF_{target}$) is used by the compression unit to perform the second compression on the image.

10. The bit rate control circuit as claimed in claim 1, further comprising another compression unit used to perform the second compression based on the target linear quantization factor ($LQF_{target}$).

11. The bit rate control circuit as claimed in claim 1, wherein the image is a static image.

12. A bit rate control method for image compression, the bit rate control method comprising:
    performing a first compression on an image, based on a default linear quantization factor ($LQF_{ini}$);
    calculating an initial number of bits per pixel ($bbp_{ini}$) and an initial number of zero coefficients ($R_{ini}$) when the first compression is performed;
    calculating a target R value ($R_{target}$) based on the initial number of bits per pixel ($bbp_{ini}$) and a target number of bits per pixel ($bpp_{target}$);
    calculating a target linear quantization factor ($LQF_{target}$) based on the target R value ($R_{target}$); and
    performing a second compression on the image based on the target linear quantization factor ($LQF_{target}$).

13. The bit rate control method as claimed in claim 12, wherein the step of calculating the target R value ($R_{target}$) includes calculating the target R value ($R_{target}$) based on the target number of bits per pixel ($bpp_{target}$) 1 by referencing a linear correlation between a coordinate of the initial number of bits per pixel ($bbp_{ini}$) and the initial number of zero coefficients ($R_{ini}$) and a common origin.

14. The bit rate control method as claimed in claim 13, wherein coordinates of the number of bits per pixel and the number of zero coefficients at the common origin are zero and total number T of coefficients.

15. The bit rate control method as claimed in claim 12, wherein the step of calculating the target linear quantization factor ($LQF_{target}$) includes calculating the $LQF_{target}$ corresponding to the $R_{target}$ by a numerical correlation between the target R value and the linear quantization factor (LQF).

16. The bit rate control method as claimed in claim 15, wherein the numerical correlation between the R value and the linear quantization factor (LQF) comprises calculation of a set of zero coefficients ($R_{set}$) correlating with a plurality of linear quantization factors (LQFs) during the first compression, and the set of zero coefficients ($R_{set}$) is provided to calculate the target linear quantization factor ($LQF_{target}$) correlating with the target R value ($R_{target}$) by linear interpolation.

17. The bit rate control method as claimed in claim 16, wherein the linear quantization factors (LQFs) are a plurality of multiples of default linear quantization factors ($LQF_{ini}$).

18. The bit rate control method as claimed in claim 16, wherein the linear quantization factors (LQFs) comprise $LQF_{ini}/4$, $LQF_{ini}/2$, $LQF_{ini}/1$, $LQF_{ini}*2$, and $LQF_{ini}*4$.

19. The bit rate control method as claimed in claim 15, wherein the numerical correlation between the R value and the linear quantization factor (LQF) is a pre-calculated correlation curve.

20. The bit rate control method as claimed in claim 12, wherein the image is a static image.

* * * * *